Figure 9:
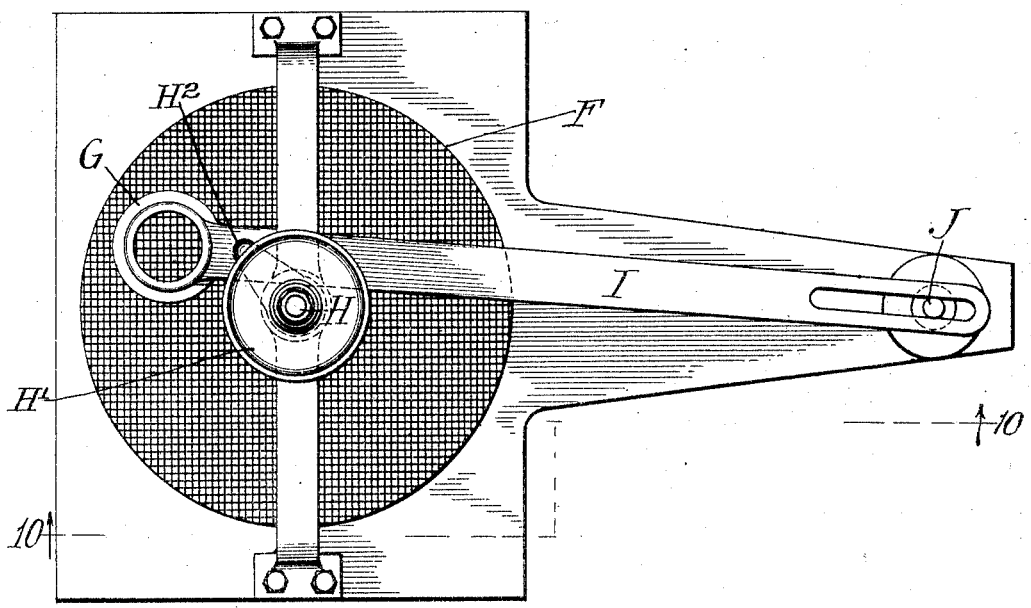

No. 776,731. PATENTED DEC. 6, 1904.
C. F. DIETZ.
DOUGH MOLDING APPARATUS.
APPLICATION FILED NOV. 11, 1903.
NO MODEL. 3 SHEETS—SHEET 1.
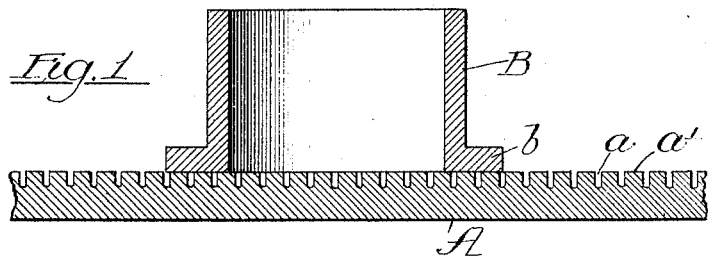
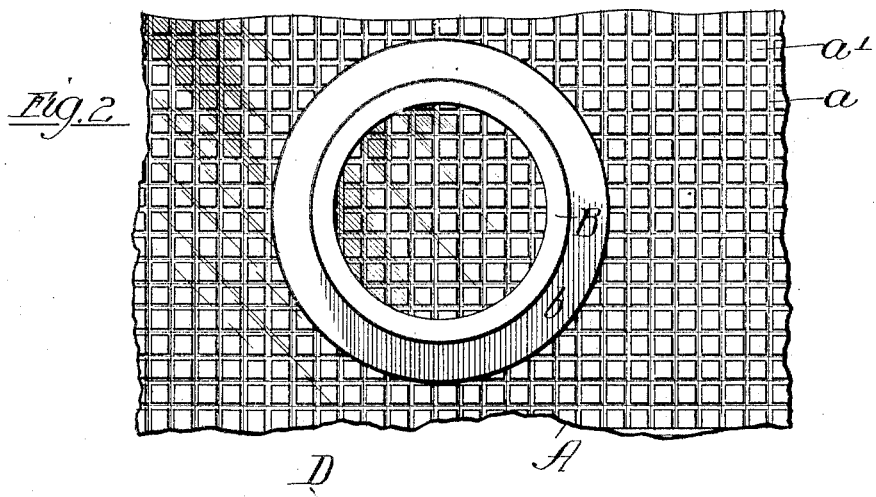
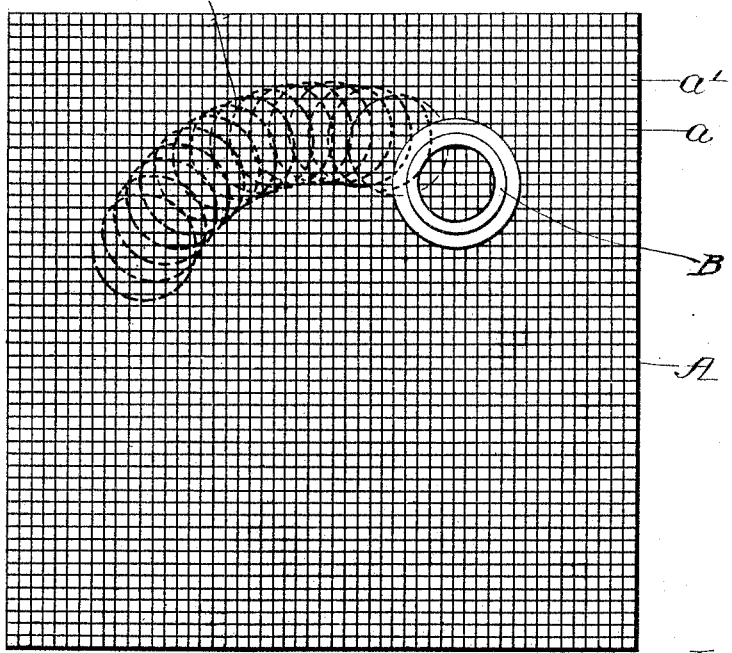
Witnesses: Inventor:
Christian F. Dietz
By Poole & Brown
his Atty's No. 776,731. PATENTED DEC. 6, 1904.
C. F. DIETZ.
DOUGH MOLDING APPARATUS.
APPLICATION FILED NOV. 11, 1903.
NO MODEL. 3 SHEETS—SHEET 2.
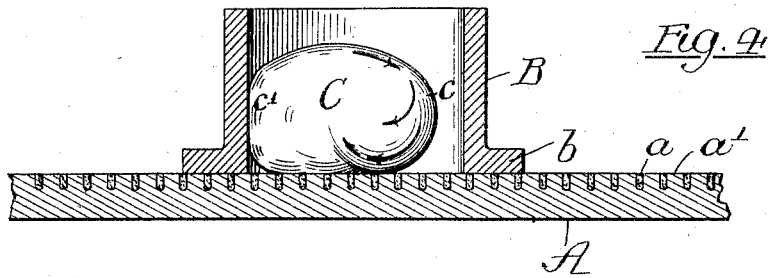
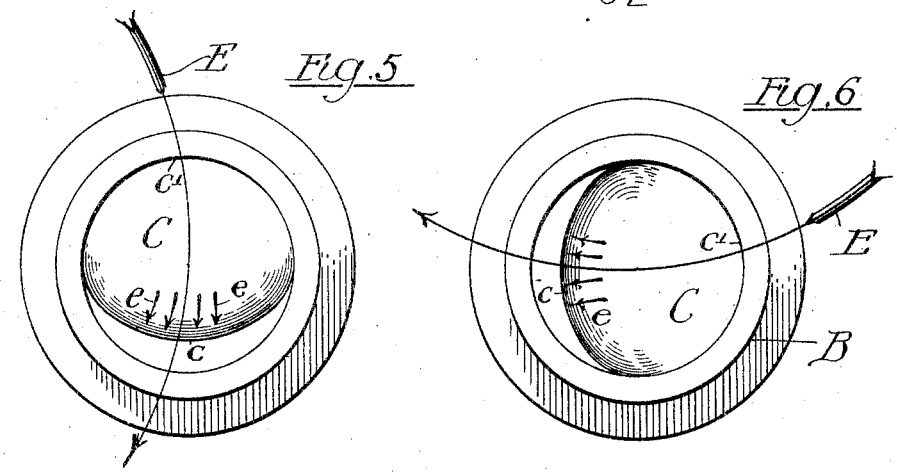
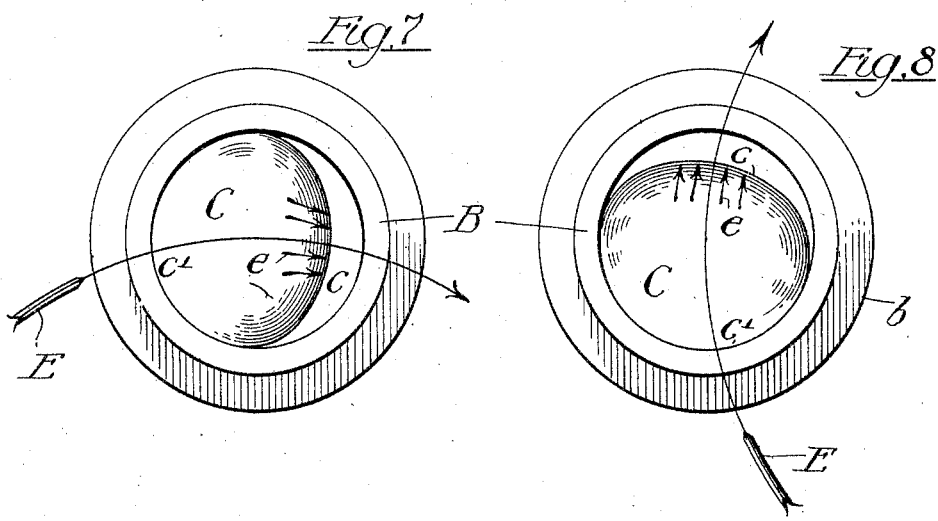
Witnesses:
H. G. Barrett
G. J. Bryce
Inventor:
Christian F. Dietz
By Poole & Brown
his Attys No. 776,731. PATENTED DEC. 6, 1904.
C. F. DIETZ.
DOUGH MOLDING APPARATUS.
APPLICATION FILED NOV. 11, 1903.
NO MODEL. 3 SHEETS—SHEET 3.

Witnesses:
H. G. Barrett
G. J. Bryce

Inventor
Christian F. Dietz
By Poole + Brown
Attys

No. 776,731.

Patented December 6, 1904.

UNITED STATES PATENT OFFICE.

CHRISTIAN F. DIETZ, OF CHICAGO, ILLINOIS, ASSIGNOR OF TWO-THIRDS TO AUGUST JUNGE, OF CHICAGO, ILLINOIS, AND PHILLIP F. CARROLL, OF JOLIET, ILLINOIS.

DOUGH-MOLDING APPARATUS.

SPECIFICATION forming part of Letters Patent No. 776,731, dated December 6, 1904.

Application filed November 11, 1903. Serial No. 180,674. (No model.)

*To all whom it may concern:*

Be it known that I, CHRISTIAN F. DIETZ, a citizen of the United States, and a resident of Chicago, in the county of Cook and State of Illinois, have invented certain new and useful Improvements in Dough-Molding Apparatus; and I do hereby declare that the following is a full, clear, and exact description thereof, reference being had to the accompanying drawings, and to the letters of reference marked thereon, which form a part of this specification.

This invention relates to a novel apparatus for carrying out the process known as "molding dough," this being the process by which when a batch of dough is in readiness for baking the individual masses of dough intended for forming separate loaves, rolls, or the like are manipulated by tucking the surface part or skin of the mass inwardly at the center of the bottom thereof, while drawing such surface part or skin radially from the center of the top thereof, so as to give a smooth and rounded form to the top of the mass.

The invention consists in the matters hereinafter described, and more particularly pointed out in the appended claims.

An apparatus embodying my invention embraces a molding surface or table having a grooved, roughened, or corrugated surface and a movable ring or open-ended receptacle which is adapted to rest and slide upon said molding surface or table and may be moved or slid over said surface in all directions. In the use of such a device or apparatus a desired quantity of dough, such as will be necessary to make a single loaf or roll, is placed within the said ring when the same is resting upon the molding surface or board, and the said ring is then moved over said board in such manner that the mass of dough will be carried or moved along or over the surface of the table, and at the same time different parts of the circumference of the mass are successively brought into a forward position with respect to the direction of movement of the mass. When the ring is thus moved, the weight of the dough resting upon the board will produce partial adhesion of the bottom part of said mass to the board, and as the ring which surrounds or incloses the mass is so moved as to bring the different parts of the mass of dough forward as the mass is moved the said mass will have its outer skin or surface portion drawn outwardly and downwardly from the center toward the margins of the mass and inwardly toward the center of the bottom thereof, with the result that the skin or surface portion of the mass is stretched in all directions from the top of the same toward the center of the bottom surface thereof, and the same effect is produced as results from hand-molding, wherein the dough at the bottom of the mass is tucked inwardly and the skin or exterior portions thereof drawn outwardly, downwardly, and inwardly at all sides of the mass by the action of the hands or fingers. In case a wooden board or table be employed the same, if it be provided with a somewhat roughened surface or if the depressions formed by the grain of the wood be filled with dough, will usually afford sufficient frictional resistance to the movement of the mass of dough to produce the result stated. In the use of a metal table or supporting surface the same may be provided with uniformly-disposed depressions or grooves, and such depressions or grooves may be filled with dough, so as to form a level surface to which the mass of dough in the ring will partially adhere as the ring is moved. Such depressions or grooves may also be formed in a wooden table or surface if found necessary or desirable to give the required adhesion or resistance to the movement of the mass of dough thereon. One way of producing the result described is to move the ring on the molding-table in such manner that the ring is constantly changing its direction of motion. When the ring is so moved, different parts of the circumference of the ring will successively press on different parts of the circumference of the mass of dough and different parts of said mass will successively become the advance part of the mass as the latter is moved, and inasmuch as the skin part of the mass will always be drawn downward and inward at the advance side of the mass the latter will be uniformly acted upon at all sides and will assume a symmetrical or evenly-rounded form.

My invention will be better understood by reference to the accompanying drawings, in which—

Figure 10:
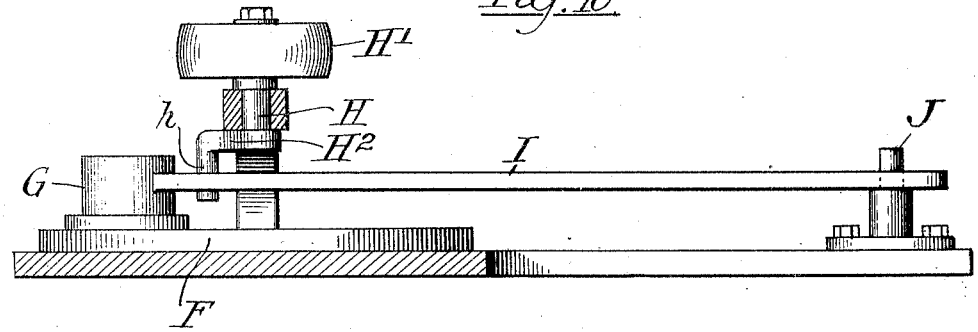

Figure 1 is a sectional view of a part of a molding table or board and a molding-ring resting thereon. Fig. 2 is a plan view of the parts shown in Fig. 1. Fig. 3 is a plan view of a molding-table containing spiral lines which illustrate the manner in which the ring may be moved to produce the desired result in the use of the apparatus. Fig. 4 is a view showing the ring in section, illustrating the effect upon the dough of the lateral motion of the ring in which the same is placed. Figs. 5, 6, 7, and 8 are four views of the ring, illustrating the movement of the same in four different directions and the effect upon the dough of constantly changing the direction of motion of the ring. Fig. 9 is a plan view of an apparatus which may be used to give the desired movement to the ring. Fig. 10 is a sectional view thereof, taken on line 10 10 of Fig. 9.

First referring to the parts constituting the essential operative parts of my device, as shown in Figs. 1 to 8, inclusive, the same consist of a flat molding-table A and a movable ring B. The table A is provided with uniformly-disposed depressions (shown in the drawings as formed by U-shaped grooves $a$) which cross each other at right angles and form rectangular flat intervening surfaces $a'$. The ring B has at its bottom edge a wide bearing-surface adapted to rest on the grooved surface of the table, said bearing-surface being conveniently formed by an outwardly-extending horizontal flange $b$ on the bottom margin of the ring and enabling the ring to be easily slid or moved laterally when resting on the grooved surface of the table. Preparatory to using the board and ring the grooves in the top surface of the table will be filled with dough, which is leveled off flush with the tops of the surfaces $a'$. The dough which thus fills the grooves affords a surface on which dough will be molded when placed within the ring B and resting on the table will partially adhere. Such dough within the grooves will be kept level by the movement of the ring over the table, the edges of said ring acting to scrape off any surplus dough which may rise above the level of the top of the table. In the use of the table and ring the ring is placed on the table, and a mass of dough of the size required for a single loaf is placed in the ring. The ring is then moved over the table in a constantly-changing course, carrying with it the mass of dough, which is pushed along over the partially-adhesive surface of the table by the pressure thereon of the part of the ring with which it is at any time in contact. As the direction of motion of the ring is constantly changing, the part of the ring in contact with the dough is also constantly changing, and all parts of the circumference of the mass of dough are successively brought into an advanced position with respect to the direction of motion of the mass. As the ring moves laterally the side of the mass of dough which is in advance will be free from the ring and its surface portion will be drawn or dragged backward at the bottom of the mass by reason of the partial adhesion of the mass to the surface of the table, while any upward movement of the rearward part of the mass or rolling motion of the mass on the table will be prevented by the contact of such rearward part of the mass with the part of the ring which presses against the same. This will be clearly seen from an inspection of Figs. 4 to 8, inclusive. As clearly seen in Fig. 4, when the ring is moved laterally in the direction of the arrow the side $c$ of the mass C, which is moving in advance, will be free from contact with the ring and the surface portion of said side $c$ will be drawn downward and toward the center of the mass by the adhesion or friction of the bottom of the mass on the board. The side $c'$ of the mass, which is being pressed upon by the ring in its lateral movement, will have no upward movement during the time it is in contact with the ring, because its frictional engagement with the ring will prevent such movement. As the ring is constantly changing its direction of movement, however, the different parts of the circumference of the mass of dough will successively come into contact with or be pressed upon by the ring and will likewise successively become the advance side of the mass, so that the surface part or skin of the mass will be continuously moving downward at one point at the side of the mass, which point will be constantly moving or shifting circumferentially around the mass as the motion of the ring is continued, thereby giving a uniform stretching action to the skin at the surface of the mass in all directions from the center of the top toward the center of the bottom. This action is well seen from Figs. 5 to 8, inclusive, which show the ring moving in four different directions when moved on the table in a circular or other curved path—as, for instance, when moved along the spiral line indicated by D in Fig. 3. In these figures the arrows E show the direction of movement of the ring, and the arrows $e$ indicate the direction in which the skin portion of the mass is drawn or stretched during such movement of the ring. These arrows show that the movement of the skin at the top of the mass is always away from the side of the ring which presses on the mass and that as the ring is moved in a constantly-varying direction such movement of the skin takes place radially outward in all directions from the center of the mass.

The same result above set forth may be produced by rotating the ring on its own center and at the same time advancing the ring. In this case the ring by its frictional contact with the dough in turning will drag the mass around, so as to bring different parts of the mass into a forward position with respect to the direction of motion of the ring. The ring may be moved on the table by hand in such manner as to bring different parts of the mass in advance, and thereby produce the result stated, or the required movement may be given to the ring by mechanism adapted for the purposes, and the combination, with a table and movable ring, of mechanism adapted to give such movement to the ring constitutes a part of the present invention.

A simple form of apparatus for moving the ring in the manner first described is shown in Figs. 9 and 10. As therein illustrated, A indicates a molding-table of circular form, which may be grooved to receive dough, as is the table shown in Figs. 1 and 2, or may be roughened to afford some frictional resistance to the movement of the dough over the same, and B indicates a ring which acts upon and operates in connection with said table. Centrally of the table A and above the same is arranged an upright shaft H, carrying at its upper end a pulley H' and having at its lower end a crank-arm H², through which rotary motion is transmitted to the ring B. The ring B is attached to one end of an actuating-arm I, the opposite end of which is slotted and has sliding engagement with a fixed pin J, arranged at some distance from the table. The crank H² has a crank-pin $h$, which is engaged with the actuating-arm I near the ring. In the operation of this device when the shaft H is turned the crank H² and ring B will be slowly revolved on or over the table A, so as to give motion to the outer end of the supporting-arm I and the ring B in a circular path and to impart bodily rotative motion to the ring without turning the latter. The ring will therefore advance in a circular line on the table and will be constantly changing its direction of movement in its advance. It follows that the ring B, thus actuated, will have the same effect in molding the mass of dough placed thereon as would result from moving a like ring by hand in the manner hereinbefore set forth and illustrated in Figs. 5 to 8. It will of course be understood that the same result will be produced by moving the board or table relatively to the ring as by moving the ring on the said board or table, and my invention therefore includes a board or table and a ring when either one of said parts is adapted to be moved relatively to the other in the plane of the table. By reason of the fact that the inner surface of the ring is continuous or annular and the further fact that the relative movement of the ring and table may take place in all directions in the plane of the table the said ring is adapted to act continuously on the mass of dough therein so long as may be found necessary to complete the molding operation.

I am aware that it has been heretofore proposed to employ for performing the same operation that is accomplished by the table and ring herein described forms of apparatus embracing in one instance a traveling belt and a straight oblique strip, in another instance of a revolving cylinder and a spiral strip or trough, and in another instance of a rotative disk with a volute strip, the mass of dough in these several instances being carried by the moving surface of the belt cylinder or disk in contact with which it rests against the straight spiral or volute strip, and the said strip being so disposed that all parts of its contact-surface are oblique with respect to the direction of motion of the moving part on which the dough rests, so that the mass of dough is given rotative movement necessary to bring different parts of its circumference into contact with the strip by rolling along the oblique surface of the strip, and the operation continues only so long as is required for the mass of dough to travel from one end of the strip to the other.

The operation of the table and ring herein described is different from the prior devices referred to from the fact that the ring and table in the molding operation are relatively so moved that the ring is constantly changing its direction of travel on the table and is moved in all directions thereon, with the result that all parts of the circumference of the mass of dough are brought in an advance position with respect to the direction of movement of the dough on the table, and the ring acts to push the mass of dough in different directions on the table by direct pressure on the mass in a direction nearly toward the center of the mass. In such prior devices the mass of dough is acted upon in all parts of its circumference through the rolling of the mass along the strip, which is fixed in its oblique relation to the table or equivalent part, while in my device the mass is acted on in all parts of its circumference through the constantly-changing direction of motion of the ring. It follows that the ring is not only adapted for continuous operation for any desired length of time, but its action is more effective than that of an oblique straight or curved strip, because the ring and table operate on the dough at all times in a manner best adapted to draw the dough radially from the center of the top of the mass downwardly on all sides toward the center of the bottom thereof.

I claim as my invention—

1. An apparatus for molding dough embracing a board or table and an open-topped ring adapted to rest and slide on said board or table, one of said parts being movable relatively to the other in the plane of the board or table.

2. An apparatus for molding dough embracing a board or table having a roughened surface and a ring provided with a wide bearing-surface at its lower edge, and adapted to receive within it the mass of dough to be molded, one of said parts being movable relatively to the other in the plane of the board or table.

3. An apparatus for molding dough embracing a board or table having a roughened surface and a ring provided at its lower edge with an outwardly-projecting, horizontal flange, and adapted to receive within it the mass of dough to be molded, one of said parts being movable relatively to the other in the plane of the board or table.

4. An apparatus for molding dough embracing a flat board or table, an open-topped ring adapted to rest and slide on said board or table, and means for moving one of said parts relatively to the other, in the plane of the board or table, adapted to constantly bring new parts of the mass of dough in advance during the relative movements of the ring and table.

5. An apparatus for molding dough embracing a flat board or table, an open-topped ring adapted to rest and slide on said board or table, one of said parts having movement relatively to the other in the plane of the board or table and in a constantly-changing direction in said plane.

6. An apparatus for molding dough embracing a flat board or table, and an open-topped ring adapted to rest and slide on said board or table and having a rotative movement relatively to the said board or table.

In testimony that I claim the foregoing as my invention I affix my signature, in presence of two witnesses, this 7th day of November, A. D. 1903.

CHRISTIAN F. DIETZ.

Witnesses:
C. CLARENCE POOLE,
GERTRUDE J. BRYCE.